(12) United States Patent
Zhao et al.

(10) Patent No.: US 9,714,709 B2
(45) Date of Patent: Jul. 25, 2017

(54) FUNCTIONALLY GRADED ARTICLES AND METHODS OF MANUFACTURE

(71) Applicants: Lei Zhao, Houston, TX (US); Zhiyue Xu, Cypress, TX (US); Guijun Deng, The Woodlands, TX (US)

(72) Inventors: Lei Zhao, Houston, TX (US); Zhiyue Xu, Cypress, TX (US); Guijun Deng, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 313 days.

(21) Appl. No.: 14/552,832

(22) Filed: Nov. 25, 2014

(65) Prior Publication Data
US 2016/0146350 A1    May 26, 2016

(51) Int. Cl.
*F16J 15/10* (2006.01)
*B32B 7/02* (2006.01)
(Continued)

(52) U.S. Cl.
CPC .............. *F16J 15/102* (2013.01); *B32B 7/02* (2013.01); *B32B 9/007* (2013.01); *B32B 9/048* (2013.01); *B32B 18/00* (2013.01); *C04B 35/522* (2013.01); *C04B 35/645* (2013.01); *C04B 35/82* (2013.01); *C04B 37/001* (2013.01); *F16J 15/108* (2013.01); *F16J 15/16* (2013.01); *F16J 15/46* (2013.01); *B22F 2302/40* (2013.01); *B32B 2264/108* (2013.01); *B32B 2581/00* (2013.01); *C04B 2235/3409* (2013.01);
(Continued)

(58) Field of Classification Search
None
See application file for complete search history.

(56) References Cited

U.S. PATENT DOCUMENTS 3,904,405 A    9/1975    Russell et al.
3,981,427 A    9/1976    Brookes
(Continued)

FOREIGN PATENT DOCUMENTS

CA    2429780 A1    12/2003
EP    0747615 B1    10/2001
(Continued)

OTHER PUBLICATIONS

Baxter et al., "Microstructure and solid particle erosion of carbon-based materials used for the protection of highly porous carbon-carbon composite thermal insulation", Journal of Materials Science, vol. 32, 1997, pp. 4485-4492.
(Continued)

*Primary Examiner* — David Sample
*Assistant Examiner* — Donald M Flores, Jr.
(74) *Attorney, Agent, or Firm* — Cantor Colburn LLP

(57) ABSTRACT

An article comprises a first member comprising a first carbon composite; and a second member disposed on the first member and comprising a second carbon composite and a reinforcing agent, wherein the second member has a gradient in the weight ratio of the second carbon composite to the reinforcing agent, and wherein the first member has one or more of the following properties different than those of the second member: elasticity; corrosion resistance; erosion resistance; or hardness.

27 Claims, 2 Drawing Sheets

(51) Int. Cl.

| | | |
|---|---|---|
| F16J 15/16 | (2006.01) | |
| B32B 9/04 | (2006.01) | |
| B32B 18/00 | (2006.01) | |
| C04B 35/32 | (2006.01) | |
| B32B 9/00 | (2006.01) | |
| C04B 35/52 | (2006.01) | |
| F16J 15/46 | (2006.01) | |
| C04B 35/645 | (2006.01) | |
| C04B 35/82 | (2006.01) | |
| C04B 37/00 | (2006.01) | |

(52) U.S. Cl.
CPC .. *C04B 2235/3418* (2013.01); *C04B 2235/40* (2013.01); *C04B 2235/421* (2013.01); *C04B 2235/428* (2013.01); *C04B 2235/5292* (2013.01); *C04B 2235/5418* (2013.01); *C04B 2237/363* (2013.01); *C04B 2237/584* (2013.01); *Y10T 428/12458* (2015.01); *Y10T 428/24942* (2015.01); *Y10T 428/24983* (2015.01)

(56) References Cited

U.S. PATENT DOCUMENTS

| | | |
|---|---|---|
| 4,116,451 A | 9/1978 | Nixon et al. |
| 4,205,858 A | 6/1980 | Shimazaki et al. |
| 4,234,638 A | 11/1980 | Yamazoe et al. |
| 4,372,393 A | 2/1983 | Baker |
| 4,426,086 A | 1/1984 | Fournie et al. |
| 4,743,033 A | 5/1988 | Guess |
| 4,798,771 A | 1/1989 | Vogel |
| 4,799,956 A | 1/1989 | Vogel |
| 4,826,181 A | 5/1989 | Howard |
| 4,885,218 A | 12/1989 | Andou et al. |
| 5,117,913 A | 6/1992 | Thernig |
| 5,134,030 A | 7/1992 | Ueda et al. |
| 5,195,583 A | 3/1993 | Toon et al. |
| 5,201,532 A | 4/1993 | Salesky et al. |
| 5,225,379 A | 7/1993 | Howard |
| 5,228,701 A | 7/1993 | Greinke et al. |
| 5,247,005 A | 9/1993 | Von Bonin et al. |
| 5,257,603 A | 11/1993 | Bauer et al. |
| 5,283,121 A | 2/1994 | Bordner |
| 5,286,574 A | 2/1994 | Foster et al. |
| 5,362,074 A | 11/1994 | Gallo et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,522,603 A | 6/1996 | Naitou et al. |
| 5,730,444 A | 3/1998 | Notter |
| 5,765,838 A | 6/1998 | Ueda et al. |
| 5,791,657 A | 8/1998 | Cain et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richey, III |
| 6,152,453 A | 11/2000 | Kashima et al. |
| 6,161,838 A | 12/2000 | Balsells |
| 6,182,974 B1 | 2/2001 | Harrelson |
| 6,234,490 B1 | 5/2001 | Champlin |
| 6,258,457 B1 | 7/2001 | Ottinger et al. |
| 6,273,431 B1 | 8/2001 | Webb |
| 6,506,482 B1 | 1/2003 | Burton et al. |
| 6,585,053 B2 | 7/2003 | Coon et al. |
| 6,789,634 B1 | 9/2004 | Denton |
| 6,880,639 B2 | 4/2005 | Rhodes et al. |
| 7,105,115 B2 | 9/2006 | Shin |
| 7,470,468 B2 | 12/2008 | Mercuri et al. |
| 7,666,469 B2 | 2/2010 | Weintritt et al. |
| 2001/0003389 A1 | 6/2001 | Pippert |
| 2002/0114952 A1 | 8/2002 | Ottinger et al. |
| 2003/0137112 A1 | 7/2003 | Richter et al. |
| 2004/0097360 A1 | 5/2004 | Benitsch et al. |
| 2004/0127621 A1 | 7/2004 | Orzal et al. |
| 2004/0155382 A1 | 8/2004 | Huang et al. |
| 2004/0178626 A1 | 9/2004 | Segreto |
| 2004/0186201 A1 | 9/2004 | Stoffer et al. |
| 2006/0042801 A1 | 3/2006 | Hackworth et al. |
| 2006/0220320 A1 | 10/2006 | Potier et al. |
| 2006/0249917 A1 | 11/2006 | Kosty |
| 2006/0272321 A1 | 12/2006 | Mockenhaupt et al. |
| 2007/0009725 A1 | 1/2007 | Noguchi et al. |
| 2007/0054121 A1 | 3/2007 | Weintritt et al. |
| 2007/0257405 A1 | 11/2007 | Freyer |
| 2008/0128067 A1 | 6/2008 | Sayir et al. |
| 2008/0175764 A1 | 7/2008 | Sako |
| 2008/0289813 A1 | 11/2008 | Gewily et al. |
| 2009/0075120 A1 | 3/2009 | Cornie et al. |
| 2009/0130515 A1 | 5/2009 | Son et al. |
| 2009/0151847 A1 | 6/2009 | Zhamu et al. |
| 2009/0302552 A1 | 12/2009 | Leinfelder |
| 2010/0098956 A1 | 4/2010 | Sepeur et al. |
| 2010/0143690 A1 | 6/2010 | Romero et al. |
| 2010/0203340 A1 | 8/2010 | Ruoff et al. |
| 2010/0207055 A1 | 8/2010 | Ueno et al. |
| 2010/0266790 A1* | 10/2010 | Kusinski ............... B32B 1/08 428/34.6 |
| 2011/0045724 A1 | 2/2011 | Bahukudumbi |
| 2012/0107590 A1 | 5/2012 | Xu et al. |
| 2013/0001475 A1 | 1/2013 | Christ et al. |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0267816 A1 | 9/2015 | Boskovski |
| 2016/0089648 A1 | 3/2016 | Xu et al. |
| 2016/0108703 A1 | 4/2016 | Xu et al. |
| 2016/0130519 A1 | 5/2016 | Zhao et al. |
| 2016/0136923 A1 | 5/2016 | Zhao et al. |
| 2016/0136928 A1 | 5/2016 | Zhao et al. |
| 2016/0138359 A1 | 5/2016 | Zhao et al. |
| 2016/0145966 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |

FOREIGN PATENT DOCUMENTS

| | | | |
|---|---|---|---|
| EP | 2056004 A1 * | 5/2009 | ............ C23C 28/00 |
| EP | 2586963 A1 | 5/2013 | |
| JP | 2014141746 | 8/2014 | |
| WO | 9403743 | 2/1994 | |
| WO | 03102360 | 12/2003 | |
| WO | 2004015510 A2 | 2/2004 | |
| WO | 2005115944 | 12/2005 | |
| WO | 2007138409 A1 | 12/2007 | |
| WO | 2008021033 A2 | 2/2008 | |
| WO | 2011039531 A1 | 4/2011 | |
| WO | 2014028149 A1 | 2/2014 | |

OTHER PUBLICATIONS

Etter et al., "Aluminium carbide formation in interpenetrating graphite/aluminium composites", Materials Science and Engineering, Mar. 15, 2007, vol. 448, No. 1, pp. 1-6.

(56) References Cited

OTHER PUBLICATIONS

Hutsch et al., "Innovative Metal-Graphite Composites as Thermally Conducting Materials", PM2010 World Congress—PM Functional Materials—Heat Sinks, 2010, 8 pages.
International Search Report and Written Opinion; International Application No. PCT/US2014/065389; International Filing Date: Nov. 13, 2014; Date of Mailing: Mar. 18, 2015; 15 pages.
International Search Report and Written Opinion; International Application No. PCT/US2015/056196; International Filing Date: Oct. 19, 2015; Date of Mailing: Jan. 26, 2016; 13 pages.
Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.
Miyamoto et al., "Development of New Composites; Ceramic Bonded Carbon", Transactions of JWRI, vol. 38, No. 2, 2009, pp. 57-61.
Moghadam et al, "Functional Metal Matrix Composites: Self-lubricating, Self-healing, and Nanocomposites-An Outlook", The Minerals, Metals & Materials Society, Apr. 5, 2014, 10 pages.
Pohlmann et al., "Magnesium alloy-graphite composites with tailored heat conduction properties for hydrogen storage applications", International Journal of Hydrogen Energy, 35 (2010), pp. 12829-12836.
Tikhomirov et al., "The chemical vapor infiltration of exfoliated graphite to produce carbon/carbon composites", Carbon, 49 (2011), pp. 147-153.
Yang et al., "Effect of tungsten addition on thermal conductivity of graphite/copper composites", Composites Part B: Engineering, May 31, 2013, vol. 55, pp. 1-4.
PCT International Search Report and Written Opinion; International Application No. PCT/US2015/054920; International Filing Date: Oct. 9, 2015; Date of Mailing: May 18, 2016; 12 pages.
International Search Report, International Application No. PCT/US2015/056885, Date of Mailing Feb. 2, 2016, Korean Intellectual Property Office; International Search Report 4 pages.
International Written Opinion, International Application No. PCT/US2015/056885, Date of Mailing Feb. 2, 2016, Korean Intellectual Property Office; Written Opinion 11 pages.
Rashad et al., "Effect of of Graphene Nanoplatelets addition on mechanical properties of pure aluminum using a semi-powder method", Materials International, Apr. 20, 2014, vol. 24, pp. 101-108.

\* cited by examiner

FUNCTIONALLY GRADED ARTICLES AND METHODS OF MANUFACTURE

BACKGROUND

Seals have been used in various tools for a wide range of applications. Because of their broad use, particularly in high pressure and high temperature applications or in other hostile environments, it is desirable to provide seals with high thermal and high chemical stability. It is also desirable to provide seals having high erosion resistance.

Elastomers are relatively soft and deformable materials and have been used in seals. However, elastomers are susceptible to decomposition under harsh conditions, thus posing limits for their applications. As an alternative, metal to metal seals have been used due to metals' high erosion resistance and excellent high pressure and high temperature tolerance. However, metals have low elasticity and low conformability. Accordingly, metals are less effective in sealing rough casing surfaces as compared to elastomers.

Thus, the industry is always receptive to new materials having improved elasticity and erosion resistance at the same time. It would be a further advantage if such materials also have improved thermal and chemical stability.

BRIEF DESCRIPTION

The above and other deficiencies in the prior art are overcome by, in an embodiment, an article comprises a first member comprising a first carbon composite; and a second member disposed on the first member and comprising a second carbon composite and a reinforcing agent, wherein the second member has a gradient in the weight ratio of the second carbon composite to the reinforcing agent, and wherein the first member has one or more of the following properties different than those of the second member: elasticity; corrosion resistance; erosion resistance; or hardness.

In another embodiment, an article comprises: a first member comprising a first carbon composite; and a second member disposed on the first member and comprising a second carbon composite including a second carbon and a second binder, wherein the second member has a gradient in the weight ratio of the second carbon to the second binder, and wherein the first member has one or more of the following properties different than those of the second member: elasticity; corrosion resistance; erosion resistance; or hardness.

A method of making an article comprises disposing a first powder mixture in a mold; the first powder mixture comprising a first carbon and a first binder; disposing a second powder mixture on the first powder mixture to provide a combined composition; the second powder mixture comprising a second carbon, a second binder, and a reinforcing agent; and the second powder mixture having a gradient in the ratio of the sum of the weights of the second carbon and the second binder relative to the weight of the reinforcing agent; and compressing the combined composition at a temperature of about 350° C. to about 1400° C. and a pressure of about 500 psi to about 30,000 psi to form the article.

In another embodiment, a method of making an article comprises forming a first member comprising a first carbon composite; and disposing a second member on the first member, the second member comprising a second carbon composite and a reinforcing agent, and the second member having a gradient in the weight ratio of the second carbon composite to the reinforcing agent, wherein the first member has one or more of the following properties different than those of the second member: elasticity; corrosion resistance; erosion resistance; or hardness.

A method of making the article can also comprise disposing a first member in a mold; the first member comprising a first carbon composite; disposing a powder mixture on the first member; the powder mixture comprising a second carbon, a second binder, and a reinforcing agent; and the second powder mixture having a gradient in the ratio of the sum of the weights of the second carbon and the second binder relative to the weight of the reinforcing agent; and compressing the powder mixture at a temperature of about 350° C. to about 1400° C. and a pressure of about 500 psi to about 30,000 psi to form the article.

In yet another embodiment, a method of making an article comprises disposing a first powder mixture in a mold; the first powder mixture comprising a first carbon and a first binder; disposing a second powder mixture on the first powder mixture to provide a combined composition; the second powder mixture comprising a second carbon and a second binder; and the second powder mixture having a gradient in the weight ratio of the second carbon to the second binder; and compressing the combined composition at a temperature of about 350° C. to about 1400° C. and a pressure of about 500 psi to about 30,000 psi to form the article.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
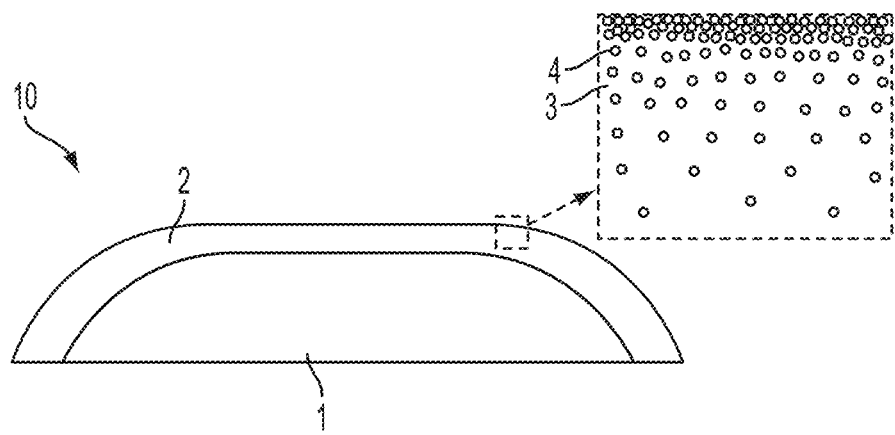
FIG. 1 shows a cross section of an article according to an embodiment of the disclosure.

The inventors hereof have found that articles made from carbon composites can be functionally graded so that a portion of the article can have one or more of the following properties different than those of another portion of the article: elasticity; corrosion resistance; erosion resistance; or hardness. The discovery allows the manufacture of articles having high elasticity and high erosion/abrasion resistance at the same time. Compared with elastomer seals, the articles herein have improved erosion/abrasion resistance and improved thermal stability thus can be used in applications where high erosion/abrasion resistance is desired or in high temperature and high pressure environments. Compared with conventional erosion resistant metal to metal seals, the articles herein dramatically increase elasticity and conformability to enable higher sealing rates and more reliable sealing.

In addition, the articles can be thermally cycled repeatedly between a low temperature (e.g., cryogenic temperatures)

and high temperature (e.g., a temperature slightly less than the decomposition temperature of article), and the article will maintain their chemical, physical, and mechanical properties without substantial deviation thereof. Further, the article will maintain their chemical, physical, and mechanical properties without substantial deviation thereof even after soaking at the low or high temperature for an extended period, e.g., more than 3 months, specifically more than 6 months, more specifically more than 1 year, and yet more specifically more than 2 years. As a further advantageous feature, the articles have excellent mechanical strength.

In an embodiment, an article comprises: a first member comprising a first carbon composite; and a second member disposed on the first member and comprising a second carbon composite and a reinforcing agent, wherein the second member has a gradient in the weight ratio of the second carbon composite to the reinforcing agent, and wherein the first member has one or more of the following properties different than those of the second member: elasticity; corrosion resistance; erosion resistance; or hardness.

In another embodiment, the variation of the properties is achieved through the variation of the carbon to binder weight ratio. For example, the second member comprises a carbon composite, which contains a carbon and a binder, and the second member has a gradient in the weight ratio of the carbon to the binder. Optionally the second member further comprises a reinforcing agent. The reinforcing agent can be uniformly distributed in the second member. Alternatively, the second member has a gradient in the weight ratio of carbon to the reinforcing agent.

The second member may have any suitable form. In one embodiment, the second member comprises a layer that is disposed on the first member. The second member may have any suitable thickness necessary to perform the wellbore operation or operations of the article with which it is associated. In an exemplary embodiment, the second member has a thickness of about 50 microns to about 10 mm or about 500 microns to about 5 mm.

In certain embodiments, the first member may be completely or partially encompassed by the second member, such as examples where the second member comprises an outer layer that completely or partially encompasses the first member. In other embodiments, the second member may only be applied to a portion or portions of the first member.

The reinforcing agent in the second member comprises one or more of the following: an oxide, a nitride, a carbide, an intermetallic compound, a metal, a metal alloy, a carbon fiber; carbon black; mica; clay; a glass fiber; or a ceramic material. The metals include Ni; Ta; Co; Cr; Ti; Mo; Zr; Fe; or W. Alloys, oxides, nitrides, carbides, or intermetallic compounds of these metals can be also used. Ceramic materials include SiC, $Si_3N_4$, $SiO_2$, BN, and the like. Combinations of the reinforcing agent may be used. In an embodiment the reinforcing agent is not the same as the binder in the carbon composition of the first member or the carbon composite in the second member.

The weight ratio of the second carbon composite to the reinforcing agent can be about 1:100 to about 100:1, about 1:50 to about 50:1, or about 1:20 to about 20:1. Advantageously, the second member has a gradient in the weight ratio of the second carbon composite to the reinforcing agent. The gradient extends from an inner portion proximate the first member toward an outer portion away from the first member. The gradient can comprise a decreasing weight ratio of the second carbon composite to the reinforcing agent from the inner portion of the second member to the outer portion of the second member. For example, the weight ratio of the second carbon composite to the reinforcing agent may vary from about 50:1, about 20:1, or about 10:1 from the inner portion of the second member to about 1:50, about 1:20, or about 1:10 at the outer portion of the second member. In an embodiment, the gradient varies continuously from the inner portion of the second member to the outer portion of the second member. In another embodiment, the gradient varies in discrete steps from the inner portion of the second member to the outer portion of the second member.

In the instance where the second member has a gradient in the weight ratio of the carbon to the binder, the weight ratio can be about 1:100 to about 1:1 or about 1:10 to about 1:2. The gradient extends from an inner portion proximate the first member toward an outer portion away from the first member. The gradient can comprise a decreasing weight ratio of the carbon to the binder from the inner portion of the second member to the outer portion of the second member. For example, the weight ratio of the carbon to the binder may vary from about 1:1 or about 1:2 from the inner portion of the second member to about 1:100 or about 1:10 at the outer portion of the second member. In an embodiment, the gradient varies continuously from the inner portion of the second member to the outer portion of the second member. In another embodiment, the gradient varies in discrete steps from the inner portion of the second member to the outer portion of the second member.

The first member and the second member independently comprise a carbon composite that contains a carbon such as graphite and a binder. The carbon composites in the first and the second members can be the same or different. In an embodiment, the carbon composite in the first member is the same as the carbon composite in the second member. In another embodiment, the binder in the second member has a higher corrosion/abrasion resistance as compared to the binder in the first member.

As used herein, graphite includes one or more of the following: natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Advantageously, the graphite comprises expanded graphite. Compared with other forms of the graphite, expanded graphite has high flexibility, high compression recovery, and larger anisotropy. Carbon composites formed from expanded graphite and a binder disclosed herein can thus have excellent elasticity in addition to desirable mechanical strength.

The carbon composites can include a graphite phase and a binder phase. The binding phase comprises a binder which binds graphite grains, graphite particles, graphite flakes, graphite crystals, or graphite microstructures, by mechanical interlocking. In an embodiment, the carbon composites comprise carbon microstructures having interstitial spaces among the carbon microstructures; wherein the binder is disposed in at least some of the interstitial spaces; and wherein the carbon microstructures comprise unfilled voids within the carbon microstructures.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a micro- or nano-sized binder. For example, a binder can occupy about 10% to about 90% of the interstitial spaces among the carbon microstructures. In an embodiment, the binder does not penetrate the individual carbon microstructures and the voids within the carbon microstructures are unfilled, i.e., not filled with any binder. Thus the carbon layers within the carbon microstructures are not locked together by a binder. Through this mechanism, the flexibility of the article, particularly, article comprises expanded graphite can be preserved.

Optionally, an interface layer is formed between the binder and the graphite. The interface layer can comprise chemical bonds, solid solutions, or a combination thereof. When present, the chemical bonds, solid solutions, or a combination thereof may strengthen the interlocking of the graphite. It is appreciated that graphite may be held together by both mechanical interlocking and chemical bonding. The thickness of the binding phase is about 0.1 to about 100 microns or about 1 to about 20 microns. The binding phase can form a continuous or discontinuous network that binds graphite together.

Exemplary binders include a nonmetal, a metal, an alloy, or a combination comprising at least one of the foregoing. The nonmetal is one or more of the following: $SiO_2$; Si; B; or $B_2O_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as Inconel*, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

Erosion/abrasion resistant binders include one or more of the following: Ni; Ta; Co, Cr, Ti, Mo; Zr, Fe, W; and their alloys. It is appreciated that the erosion/abrasion resistant binders should be relatively ductile as well so that the article can conform sufficiently to seal rough surfaces. Given their high toughness, the erosion resistant binders, if used, can be limited to regions near the article surface. More ductile binders can be used in other portions of the article such as in the first member. In this manner, the article can be erosion/abrasion resistant and at the same time deform sufficiently under limited setting force. In an embodiment the second binder in the carbon composition of the second member comprises an erosion/abrasion resistant binder.

The binder used to make the article is micro- or nano-sized. In an embodiment, the binder has an average particle size of about 0.05 to about 250 microns, about 0.05 to about 50 microns, about 0.05 to about 10 microns, specifically, about 0.5 to about 5 microns, more specifically about 0.1 to about 3 microns. Without wishing to be bound by theory, it is believed that when the binder has a size within these ranges, it disperses uniformly among the graphite.

When an interface layer is present, the binding phase comprises a binder layer comprising a binder and an interface layer bonding graphite to the binder layer. The interface layer comprises one or more of the following: a C-metal bond; a C—B bond; a C—Si bond; a C—O—Si bond; a C—O-metal bond; or a metal carbon solution. The bonds are formed from the carbon on the surface of the graphite and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC and $B_4C$, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of graphite, based on the total weight of the carbon composites. The binder is present in an amount of about 5 wt. % to about 75 wt. % or about 20 wt. % to about 50 wt. %, based on the total weight of the carbon composites.

Referring to FIG. 1, in an exemplary embodiment, the article 10 includes, a first member 1 comprising a first carbon composite. The article 10 also includes a second member 2 disposed on the first member 1 and comprising a second carbon composite and a reinforcing agent, wherein the second member 2 has a gradient in the weight ratio of the second carbon composite 3 to the reinforcing agent 4.

Figure 2:
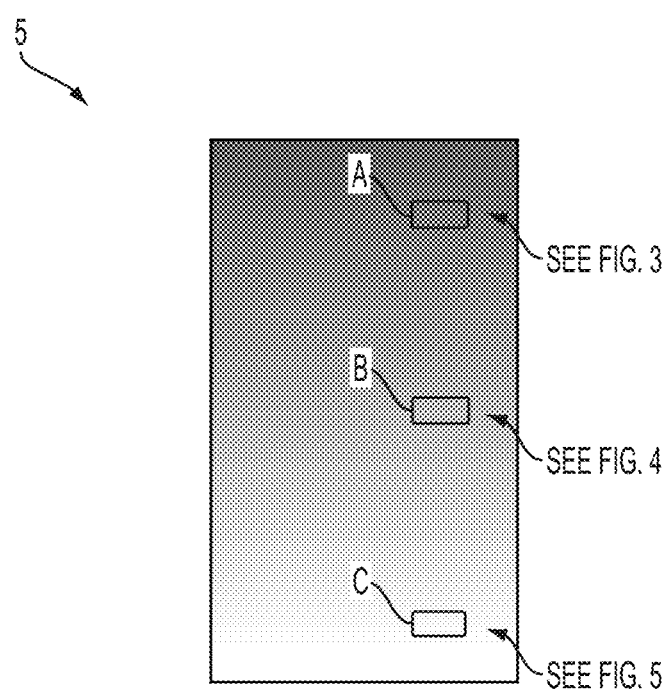
FIG. 2 shows a cross section of a second member having a gradient graphite to binder ratio, where the region with the highest graphite to binder ratio has the lightest value of the grayscale whereas the region with the lowest graphite to binder ratio is indicated by the darkest value of the grayscale.

FIG. 2 shows a cross section of a second member 5 having a gradient graphite to binder ratio. In FIG. 2, the region with the highest graphite to binder ratio has the lightest value of the grayscale whereas the region with the lowest graphite to binder ratio is indicated by the darkest value of the grayscale. As shown in FIG. 2, the graphite to binder ratio increases gradually from the top of the second member to the bottom of the second member.

Figure 3:
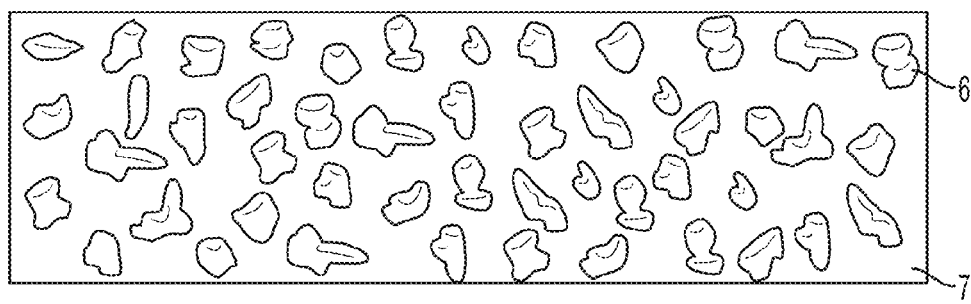
FIG. 3 illustrates the microstructure of region A of the second member shown in FIG. 2.
Figure 4:
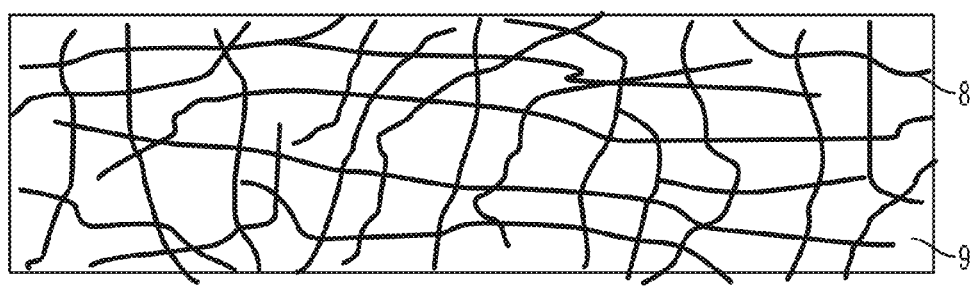
FIG. 4 illustrates the microstructure of region B of the article shown in FIG. 2.
Figure 5:
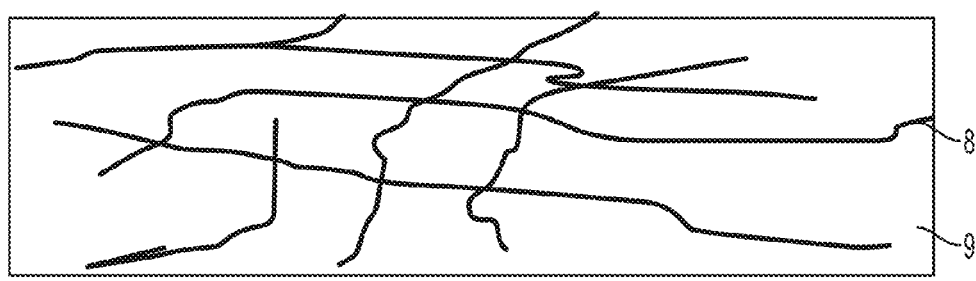
FIG. 5 illustrates the microstructure of region C of the article shown in FIG. 2.

The microstructures of regions A-C of the second member are shown in FIGS. 3-5 respectively. As shown in FIG. 3, near the top of the second member where the article is exposed to abrasives, the binder 7 dominates with graphite particles 6 dispersed therein as a lubricant to reduce friction between the abrasives and the article surface. FIG. 4 shows that in the middle of the second member, the binder forms a binding phase 8 binding the graphite 9 together to improve the structure integrity and the thermal resistance of the article. As shown in FIG. 5, at the bottom of the second member, the graphite phase 9 dominates allowing higher elasticity thus more efficient and reliable sealing.

One way to form the functionally graded article includes: disposing a first powder mixture in a mold; the first powder mixture comprising a first carbon and a first binder; disposing a second powder mixture on the first composition to provide a combined composition; the second powder mixture comprising a second carbon, a second binder, and a reinforcing agent; and the second powder mixture having a gradient in the ratio of the sum of the weights of the second carbon and the second binder relative to the weight of the reinforcing agent; and compressing the combined composition at a temperature of about 350° C. to about 1200° C. and a pressure of about 500 psi to about 30,000 psi to form the article.

In the instance where the second member has a gradient in the weight ratio of the carbon to the binder, the method comprises: disposing a first powder mixture in a mold; the first powder mixture comprising a first carbon and a first binder; disposing a second powder mixture on the first powder mixture to provide a combined composition; the second powder mixture comprising a second carbon and a second binder; and the second powder mixture having a gradient in the weight ratio of the second carbon to the second binder; and compressing the combined composition at a temperature of about 350° C. to about 1400° C. and a pressure of about 500 psi to about 30,000 psi to form the article.

In an embodiment, the second powder mixture is disposed in multiple portions in order to establish the gradient in the ratio of the sum of the weights of the second carbon and the second binder relative to the weight of the reinforcing agent (also referred to as raw material weight ratio). For example, a first portion of the second powder mixture can have a raw material weight ratio of 90:10. A second portion of the second powder mixture can have a raw material weight ratio of 80:20. A third portion of the second powder mixture can have a raw material weight ratio of 70:30. And the last portion of the second powder mixture can have a raw material weight ratio of 10:90. Once the first powder mixture is disposed in a mold, the first portion of the second powder mixture is disposed on the first powder mixture, the second portion is disposed on the first portion, and the third portion is disposed on the second portion until the last portion is disposed in the mold. The number of the portions is not particularly limited. In an embodiment, the gradient is established by successively disposing the second powder mixture in about 3 to about 100 portions, about 3 to about 50 portions, about 3 to about 20 portions, about 5 to about 15 portions, or about 5 to 10 portions, wherein the successive portions have a decreasing raw material weight ratio. The second powder mixture can be disposed in a similar manner in order to establish the gradient in the weight ratio of the second carbon to the second binder.

The powder mixtures can be formed by blending the graphite and the micro- or nano-sized binder and the reinforcing agent, if present, via any suitable methods known in the art. Examples of suitable methods include ball mixing, acoustic mixing, ribbon blending, vertical screw mixing, and V-blending.

The article can be formed via a one-step process or a two-step process. In a two-step process, the combined composition is compressed to provide a green compact by cold pressing; and then the green compact is compressed and heated thereby forming the article. In another embodiment, the combined composition can be pressed at room temperature to form a compact, and then the compact is heated at atmospheric pressure to form the article. These processes can be referred to as two-step processes. Alternatively, the combined composition can be compressed and heated directly to form the article. The process can be referred to as a one-step process.

The graphite can be in the form of a chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns.

Referring to the two-step process, cold pressing means that the combined composition is compressed at room temperature or at an elevated temperature as long as the binder does not significantly bond with the graphite. In an embodiment, greater than about 80 wt.%, greater than about 85 wt.%, greater than about 90 wt.%, greater than about 95 wt.%, or greater than about 99 wt.% of the graphite are not bonded in the green compact. The pressure to form the green compact can be about 500 psi to about 10 ksi and the temperature can be about 20° C. to about 200° C. The reduction ratio at this stage, i.e., the volume of the green compact relative to the volume of the combined composition, is about 40% to about 80%. The density of the green compact is about 0.1 to about 5 g/cm³, about 0.5 to about 3 g/cm³, or about 0.5 to about 2 g/cm³.

The green compact can be heated at a temperature of about 350° C. to about 1400° C., specifically about 800° C. to about 1400° C. to form the article. In an embodiment, the temperature is about ±20° C. to about ±100° C. of the melting point of the binder, or about ±20° C. to about ±50° C. of the melting point of the binder. In another embodiment, the temperature is above the melting point of the binder, for example, about 20° C. to about 100° C. higher or about 20° C. to about 50° C. higher than the melting point of the binder. When the temperature is higher, the binder becomes less viscose and flows better, and less pressure may be required in order for the binder to be evenly blended with the graphite. However, if the temperature is too high, it may have detrimental effects to the instrument.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. For example, the combined composition can be charged with a current, which flows through the composition generating heat very quickly. Optionally, the heating can also be conducted under an inert atmosphere, for example, under argon or nitrogen. In an embodiment, the green compact is heated in the presence of air.

The heating can be conducted at a pressure of about 500 psi to about 30,000 psi or about 1000 psi to about 5000 psi. The pressure can be a superatmospheric pressure or a subatmospheric pressure. In an embodiment, the desirable pressure to form the article is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the article can be applied. The temperature and the pressure can be held at the predetermined maximum temperature and the predetermined maximum pressure for about 5 minutes to about 120 minutes. In an embodiment, the predetermined maximum temperature is about ±20° C. to about ±100° C. of the melting point of the binder, or about ±20° C. to about ±50° C. of the melting point of the binder.

The reduction ratio at this stage, i.e. the volume of the article relative to the volume of the green compact, is about 10% to about 70% or about 20 to about 40%. The density of the article can be varied by controlling the degree of compression. The article can have a density of about 0.5 to about 10 g/cm³, about 1 to about 8 g/cm³, about 1 to about 6 g/cm³, about 2 to about 5 g/cm³, about 3 to about 5 g/cm³, or about 2 to about 4 g/cm³.

Alternatively, also referring to a two-step process, the combined composition can be first pressed at room temperature and a pressure of about 500 psi to 30,000 psi to form a compact; and the compact can be further heated at a temperature of about 350° C. to about 1400° C., specifically about 800° C. to about 1400° C. to make the article. In an embodiment, the temperature is about ±20° C. to about ±100° C. of the melting point of the binder, or about ±20° C. to about ±50° C. of the melting point of the binder. In another embodiment, the temperature can be about 20° C. to about 100° C. higher or about 20° C. to about 50° C. higher than the melting point of the binder. The heating can be conducted at atmospheric pressure in the presence or absence of an inert atmosphere.

In another embodiment, the article can be made from the combined composition directly without making the green compact. The pressing and the heating can be carried out simultaneously. Suitable pressures and temperatures can be the same as discussed herein for the second step of the two-step processes.

Hot pressing is a process that applies temperature and pressure simultaneously. It can be used in both the one-step and the two-step processes to make the functionally graded article.

In another embodiment, the first member and the second member are formed separately. Then the first member is disposed on the second member. For example, a mold can be loaded with a first powder mixture, which is processed according to a one-step or two-step method as disclosed herein to make the article from the combined composition. Similarly, a mold can be loaded with a second powder mixture, which is processed according to a one-step or two-step method as disclosed herein to make the article from the combined composition, wherein the second member has a gradient in the weight ratio of the second carbon composite to the reinforcing agent or a gradient in the weight ratio of the second carbon to the second binder.

The methods to dispose the first member on the second member are not particularly limited. In an embodiment, the first member is laminated to the second member by applying a localized heat to the surface of the first member and/or the surface of the second member. Other exemplary methods include isostatic pressing, diffusion bonding, thermal molding, welding, brazing, and the like.

In another embodiment, after a first member is formed, it is disposed in a mold. Next, a second powder mixture as described herein is disposed on a surface of the first member. Then the second powder mixture and the first member are molded together forming a functionally graded article.

Functionally graded articles herein can be formed in many different shapes, such as a ring, tube, pipe, rod, toroid, sphere, polygon, cone, cylinder, truncated shapes thereof, and the like. Such a shape can result from the molding process, extrusion, and the like. Additionally, the molded shape further can be subjected to various shaping processes including cutting, sawing, ablating, and other material removal methods.

The functionally graded articles have a number of advantageous properties and can be used in a wide variety of applications. The articles can be used to make a tool or a component of a tool. Illustrative tools include seals, high pressure beaded frac screen plugs, screen base pipe plugs, compression packing elements, O-rings, bonded seals, bullet seals, sub-surface safety valve seals, sub-surface safety valve flapper seal, dynamic seals, back-up rings, drill bit seals, liner port plugs, debris barriers, drill in stim liner plugs, inflow control device plugs, flappers, ball seats, gas lift valve plug, fluid loss control flappers, electric submersible pump seals, shear out plugs, flapper valves, gaslift valves, and sleeves. Other illustrative articles include a nuclear reactor pressure vessel seal; a nuclear actuator seal; a pump seal in nuclear plants; a pressure relieving seal; a rotary seal; a spool valve seal; a brake piston seal; a shaft seal; a bearing sealing; or a pinion seal. In an embodiment, the article is a downhole element.

The articles have a high thermal resistance with a range of operation temperatures from about −65° F. up to about 1200° F. In an especially advantageous feature, by forming functionally graded articles, both the erosion/corrosion resistance and the elasticity are improved. The articles are particularly suitable for use as seals subject to erosion/corrosion damage, for example flapper or rotary ball valve seals that are used in safety or barrier valve applications. The articles or the tools comprising the articles can be used for various applications. In an embodiment, the articles or the tools comprising the articles can be used to inhibit flow.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An article comprising:
   a first member comprising a first carbon composite; and
   a second member disposed on the first member and comprising a second carbon composite and a reinforcing agent, the carbon in the first carbon composite and the carbon in the second carbon composite each independently comprising one or more of the following: expanded graphite; expandable graphite; natural graphite; or synthetic graphite;
   wherein the second member has a gradient in the weight ratio of the second carbon composite to the reinforcing agent, and
   wherein the first member has one or more of the following properties different than those of the second member: elasticity; corrosion resistance; erosion resistance; or hardness.

2. The article of claim 1, wherein the gradient extends from an inner portion proximate the first member toward an outer portion away from the first member.

3. The article of clam 2, wherein the gradient comprises a decreasing weight ratio of the second carbon composite to the reinforcing agent from the inner portion of the second member to the outer portion of the second member.

4. The article of clam 3, wherein the gradient varies continuously from the inner portion of the second member to the outer portion of the second member.

5. The article of claim 3, wherein the gradient varies in discrete steps from the inner portion of the second member to the outer portion of the second member.

6. The article of claim 1, wherein the first carbon composite and the second carbon composite each independently comprise carbon microstructures having interstitial spaces among the carbon microstructures; wherein a binder is disposed in at least some of the interstitial spaces; and wherein the carbon microstructures comprise unfilled voids within the carbon microstructures.

7. The article of claim 1, wherein the first and the second carbon composites each independently comprises at least two carbon microstructures and a binding phase disposed between the at least two carbon microstructures; and wherein the binding phase comprises a binder.

8. The article of claim 7, wherein the binding phase comprises a binder layer and an interface layer bonding one of the at least two carbon microstructures to the binder layer; and wherein the interface layer comprises one or more of the following: a C—metal bond; a C—B bond; a C—Si bond; a C—O—Si bond; a C—O-metal bond; or a metal carbon solution.

9. The article of claim 1, wherein the reinforcing agent comprises one or more of the following: an oxide, a nitride, a carbide, an intermetallic compound, a metal, a metal alloy, a carbon fiber; carbon black; mica; clay; a glass fiber; or a ceramic material.

10. The article of claim 1, wherein the article is a nuclear reactor pressure vessel seal; a nuclear actuator seal; a pump seal in nuclear plants; a pressure relieving seal; a rotary seal; a spool valve seal; a brake piston seal; a shaft seal; a bearing sealing; or a pinion seal.

11. The article of claim 1, wherein the article is a downhole article selected from a seal; a seal seat; a seal assembly; a high pressure beaded frac screen plug; a screen base pipe plug; a rotary ball valve seal, a compression packing element; an O-ring; a bonded seal; a bullet seal; a sub-surface safety valve seal; a sub-surface safety valve flapper seal; a dynamic seal; a back-up ring; a drill bit seal; a liner port plug; a debris barrier; a drill in stim liner plug; an inflow control device plug; a flapper; a ball seat; a gas lift valve plug; a fluid loss control flapper; an electric submersible pump seal; a shear out plug; a flapper valve; a gaslift valve; or a sleeve.

12. An article comprising:
   a first member comprising a first carbon composite; and
   a second member disposed on the first member and comprising a second carbon composite and a reinforcing agent, the second member having a gradient in the weight ratio of the second carbon composite to the reinforcing agent;
   wherein each of the first carbon composite and the second carbon composite independently comprises a carbon and a binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium; and
   the first member has one or more of the following properties different than those of the second member: elasticity; corrosion resistance; erosion resistance; or hardness.

13. An article comprising:
a first member comprising a first carbon composite; and
a second member disposed on the first member and comprising a second carbon composite including a second carbon and a second binder, the carbon in the first carbon composite and the carbon in the second carbon composite each independently comprising one or more of the following: expanded graphite; expandable graphite; natural graphite; or synthetic graphite
wherein the second member has a gradient in the weight ratio of the second carbon to the second binder, and
wherein the first member has one or more of the following properties different than those of the second member: elasticity; corrosion resistance; erosion resistance; or hardness.

14. The article of claim 13, wherein the gradient extends from an inner portion proximate the first member toward an outer portion away from the first member.

15. The article of clam 14, wherein the gradient comprises a decreasing weight ratio of the second carbon to the second binder from the inner portion of the second member to the outer portion of the second member.

16. The article of claim 14, wherein the second binder comprises one or more of the following: Ni; Cr; Fe; W; or Co.

17. A method of making an articled, the method comprising:
disposing a first powder mixture in a mold; the first powder mixture comprising a first carbon and a first binder;
disposing a second powder mixture on the first powder mixture to provide a combined composition; the second powder mixture comprising a second carbon, a second binder, and a reinforcing agent; and the second powder mixture having a gradient in the ratio of the sum of the weights of the second carbon and the second binder relative to the weight of the reinforcing agent; and
compressing the combined composition at a temperature of about 350° C. to about 1400° C. and a pressure of about 500 psi to about 30,000 psi to form the article;
wherein the compressed first powder forms a first member comprising a first carbon composite, the first carbon composite comprises the first carbon and the first binder; and
the compressed second powder forms a second member comprising the reinforcing agent and a second carbon composite, the second carbon composite comprising the second carbon and the second binder; and
wherein the article comprises:
the first member; and
the second member disposed on the first member;
the carbon in the first carbon composite and the carbon in the second carbon composite each independently comprising one or more of the following: expanded graphite; expandable graphite; natural graphite; or synthetic graphite;
the second member having a gradient in the weight ratio of the second carbon composite to the reinforcing agent, and
the first member has one or more of the following properties different than those of the second member: elasticity; corrosion resistance; erosion resistance; or hardness.

18. The method of claim 17, wherein the second powder mixture is disposed in multiple portions to establish the gradient in the ratio of the sum of the weights of the second carbon and the second binder relative to the weight of the reinforcing agent.

19. A method of making an article, the method comprising:
forming a first member comprising a first carbon composite; and
disposing a second member on the first member to form the article, the second member comprising a second carbon composite and a reinforcing agent, and the second member having a gradient in the weight ratio of the second carbon composite to the reinforcing agent,
wherein the carbon in the first carbon composite and the carbon in the second carbon composite each independently comprises one or more of the following:
expanded graphite; expandable graphite; natural graphite; or synthetic graphite; and
the first member has one or more of the following properties different than those of the second member: elasticity, corrosion resistance, erosion resistance, or hardness.

20. The method of claim 19, further comprising forming the second member.

21. The method of claim 20, further comprising compressing a powder mixture at a temperature of about 350° C. to about 1400° C. and a pressure of about 500 psi to about 30,000 psi; the powder mixture comprising a carbon, a binder, and the reinforcing agent and having a gradient in the ratio of the sum of the weights of the carbon and the binder relative to the weight of the reinforcing agent;
wherein the compressed powder mixture forms the second member comprising the reinforcing agent and the second carbon composite, the second carbon composite comprising the carbon and the binder.

22. The method of claim 19, wherein disposing the second member on the first member comprises laminating the second member to the first member.

23. A method of making an article, the method comprising:
disposing a first member in a mold; the first member comprising a first carbon composite;
disposing a powder mixture on the first member; the powder mixture comprising a second carbon, a second binder, and a reinforcing agent; and the second powder mixture having a gradient in the ratio of the sum of the weights of the second carbon and the second binder relative to the weight of the reinforcing agent; and
compressing the powder mixture at a temperature of about 350° C. to about 1400° C. and a pressure of about 500 psi to about 30,000 psi to form the article;
wherein the compressed powder mixture forms a second member comprising the reinforcing agent and a second carbon composite, the second carbon composite comprising the second carbon and the second binder; and
wherein the article comprises the first member; and
the second member disposed on the first member;
the carbon in the first carbon composite and the carbon in the second carbon composite each independently comprising one or more of the following: expanded graphite; expandable graphite; natural graphite; or synthetic graphite;
the second member having a gradient in the weight ratio of the second carbon composite to the reinforcing agent, and the first member has one or more of the following properties different than those of the second member: elasticity; corrosion resistance; erosion resistance; or hardness.

24. A method of inhibiting flow comprising employing one or more of an article comprising:
 a first member comprising a first carbon composite; and
 a second member disposed on the first member and comprising a second carbon composite and a reinforcing agent, the carbon in the first carbon composite and the carbon in the second carbon composite each independently comprising one or more of the following: expanded graphite; expandable graphite; natural graphite; or synthetic graphite;
 the second member having a gradient in the weight ratio of the second carbon composite to the reinforcing agent, and
 the first member has one or more of the following properties different than those of the second member: elasticity; corrosion resistance; erosion resistance; or hardness.

25. A method of inhibiting flow comprising employing one or more of an article comprising:
 a first member comprising a first carbon composite; and
 a second member disposed on the first member and comprising a second carbon composite including a second carbon and a second binder, the carbon in the first carbon composite and the carbon in the second carbon composite each independently comprising one or more of the following: expanded graphite; expandable graphite; natural graphite; or synthetic graphite;
 the second member having a gradient in the weight ratio of the second carbon to the second binder, and
 the first member has one or more of the following properties different than those of the second member: elasticity; corrosion resistance; erosion resistance; or hardness.

26. A method of making an article, the method comprising:
 disposing a first powder mixture in a mold; the first powder mixture comprising a first carbon and a first binder;
 disposing a second powder mixture on the first powder mixture to provide a combined composition; the second powder mixture comprising a second carbon and a second binder; and the second powder mixture having a gradient in the weight ratio of the second carbon to the second binder; and
 compressing the combined composition at a temperature of about 350° C. to about 1400° C. and a pressure of about 500 psi to about 30,000 psi to form the article;
 wherein the compressed first powder forms a first member comprising a first carbon composite, the first carbon composite comprising the first carbon and the first binder; and
 the compressed second powder forms a second member comprising a second carbon composite, the second carbon composite comprising the second carbon and the second binder; and
 wherein the article comprises:
 the first member; and
 the second member disposed on the first member;
 the carbon in the first carbon composite and the carbon in the second carbon composite each independently comprising one or more of the following: expanded graphite; expandable graphite; natural graphite; or synthetic graphite;
 the second member having a gradient in the weight ratio of the second carbon to the second binder, and
 the first member has one or more of the following properties different than those of the second member: elasticity; corrosion resistance; erosion resistance; or hardness.

27. The method of claim 26, wherein the second powder mixture is disposed in multiple portions to establish the gradient in the weight ratio of the second carbon to the second binder.

* * * * *